Dec. 19, 1939.  H. J. SHERRILL  2,183,823

HYDRAULIC TRANSMISSION

Filed April 27, 1939

Harry J. Sherrill
INVENTOR

BY W. B. Harpman
ATTORNEY

Patented Dec. 19, 1939

2,183,823

UNITED STATES PATENT OFFICE 2,183,823

HYDRAULIC TRANSMISSION

Harry J. Sherrill, Youngstown, Ohio

Application April 27, 1939, Serial No. 270,383

5 Claims. (Cl. 74—294)

This invention relates to a hydraulic transmission.

The principal object of this invention is the provision of a hydraulic transmission adapted for use in an automobile; the same being placed in direct connection between the power source and the drive shaft of the said automobile. The hydraulic transmission taking the place of the conventional geared transmission and clutch mechanisms.

A further object of this invention is the provision of a hydraulic transmission providing both automatic and manual control of the same. The said manual and automatic controls being operative at all times.

A further object of this invention is the provision of a hydraulic transmission incorporating therein a reversing mechanism subject to the same automatic and manual controls.

A still further object of this invention is the provision of a hydraulic transmission adapted to be positioned directly between the driving and driven shafts of an automobile and comprising a relatively few parts which will, thru their functioning, upon activation of the drive shaft, transmit motion to the driven shaft in a manner suitable for bringing an automobile under way gradually and evenly and which will automatically continually move the driven shaft toward a degree of motion relative to that of the drive shaft as the speed of the drive shaft increases and which will upon the reaching of a pre-determined speed of the drive shaft transmit that same degree of speed to the driven shaft thus providing for the direct drive thru this hydraulic transmission at such times as the automobile using the same attains a pre-determined speed.

A still further object of this invention is the provision of a hydraulic transmission which includes a manual control operatable at all times, the manipulation of which will enable the hydraulic transmission to be readily reversed as to driving motion with a degree of ease that will enable the automobile to be effectively run alternately forward and backward thru the utilization of the manual control of the transmission.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein.

Figure 1:
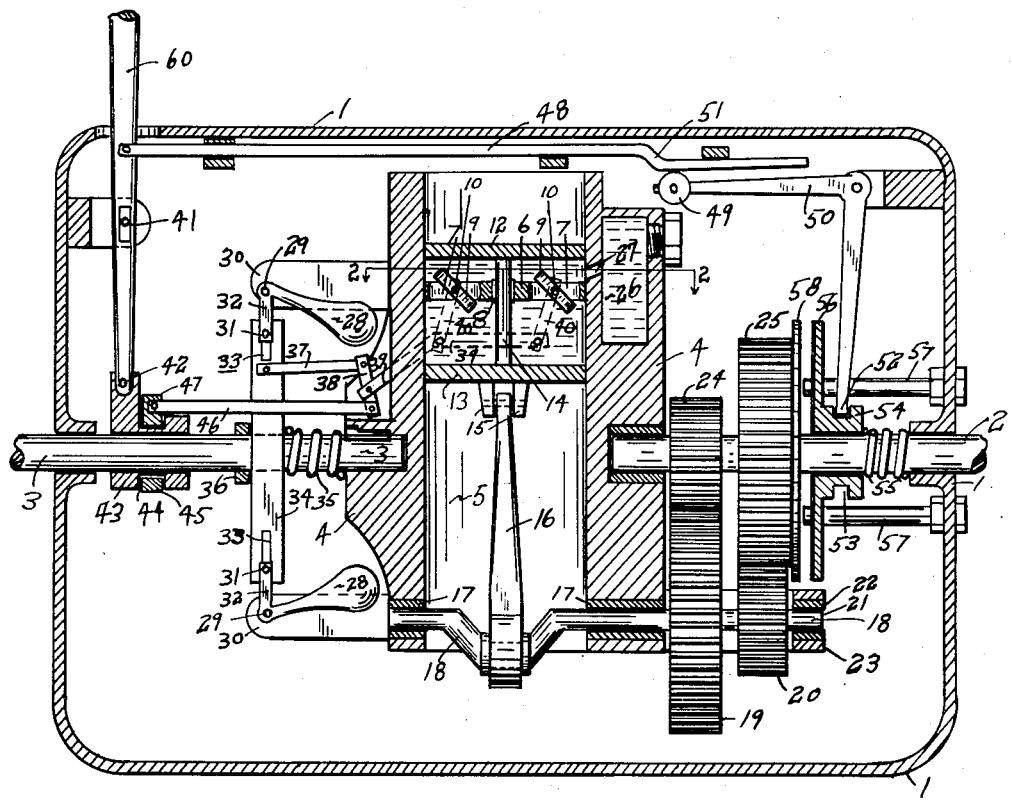
Figure 1 is a side elevation of the hydraulic transmission showing some of the parts thereof in cross section and a portion of the control levers thereof in dotted lines so that their positioning in relation to the other parts of the device may be more readily understood.

By referring to the drawing and Figure 1 in particular it will be seen that the invention comprises a hydraulically controlled transmission; the various operating parts of which are enclosed in a suitable housing 1. Entering this housing 1 at its right hand side there is a drive shaft 2 which is intended to be connected to a power source such as the conventional internal combustion engine used in automobiles. Entering this housing 1 at its left side there is a driven shaft 3 which is intended to be connected to the differential of an automobile so that motion of the drive shaft 2 will be carried thru the transmission and to the differential and driving wheels of the automobile thru the shaft 3.

Figure 2:
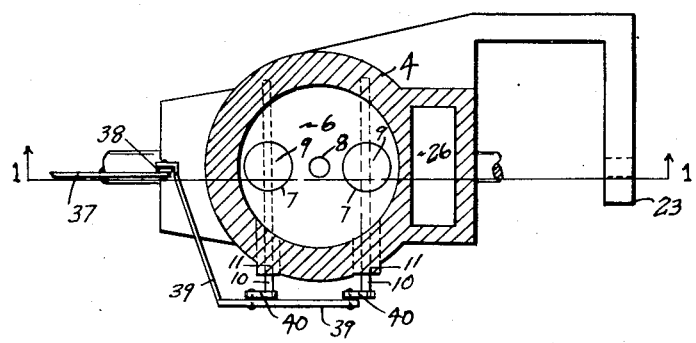
Figure 2 is a sectional view taken on lines 2—2 of Figure 1 and showing parts of the control levers in detail.

Still referring to Figure 1 of the drawing it will be seen that a cylindrical body member 4 is centrally positioned on the inner ends of the shafts 2 and 3 and has formed therein a cylinder 5 in which is positioned near the upper end thereof a partition 6 having a pair of openings 7 formed therein together with a centrally positioned gland 8. Positioned in these openings 7 there are a pair of valves 9 which are carried and activated by shafts 10; the shafts 10 extending outwardly thru the cylindrical body 4 thru suitable glands 11 (see Figure 2). Also positioned within this cylinder 5 there is a piston having an upper head 12 and a lower head 13 and a centrally positioned rod 14 formed therebetween. The lower piston head 13 having formed on its lower surface a pair of depending portions 15 carrying suitable bushings and a pin to establish a movable connection between the double headed piston and a connecting rod 16. Positioned in suitable bushings 17 in the lower portions of the cylindrical body member 4, there is a crank shaft 18, the crank portion of which is encircled by the lower end of the connecting rod 16. This crank shaft 18 extends outwardly from the cylindrical body portion 4 to the right thereof where it is provided with a pair of gears 19 and 20 both of which are keyed thereto. The outermost end 21 of the crank shaft 18 is suitably supported in a bushing 22 positioned in a U-shaped bracket like projection 23 on the cylindrical body member 4. The gears 19 and 20 are adapted to engage at all times a similar pair of gears 24 and 25 occupying reversed positions in relation to the gears 19 and 20 and positioned upon the shaft 2; the gear 24 being keyed to the shaft 2 and the gear 25 being rotatably positioned thereon so that the shaft 2 may revolve freely without revolving the gear 25. It is obvious that motion of the shaft 2 will, therefore, turn the gears 24 and 19 which are meshed and thru the crank shaft 18 actuate the connecting rod 16 and double headed piston, the heads 12 and 13 of which are positioned one above and one below the partition 6. It will thus be seen that upon filling the space between the heads 12 and 13 of the double headed piston with oil, together with a reservoir 26 which is in communication therewith that movement of the double headed piston vertically in the cylinder 5 will necessarily force the oil back and forth thru the valve openings 7 in the partition 6 and that so long as the valves 9 remain open the motion of the drive shaft 2 simply causes the double headed piston to move back and forth in the cylinder 5 and the oil to flow back and forth thru the valved openings 7. It will also be seen that when the valved openings 7 are closed partially by the valves 9 that the motion of the double headed piston is restricted in direct relation to the degree of closure these valves 9 and that therefore the entire cylindrical body 4, together with the crank shaft 18 and the gear 19 begins to revolve about the gear 24. The revolving motion being imparted to the cylindrical body 4 and its component structure thru the crank like positioning of the crank shaft 18 in relation to this cylindrical body member 4; it being obvious that opening of the valves 9 will again allow the double headed piston to move within the cylinder 5 and permit the crank shaft 18 to revolve thus dissipating the motion of the drive shaft 2. The driven shaft 3 being keyed in position to the cylindrical body member 4, all revolving motion of the cylindrical body 4 and its component structural parts is transmitted directly thru the shaft 3 to the wheels of the automobile. It will thus be seen that by varying the degree of closure of the valves 9 in the openings in the partition 6 in the cylinder 5 the passage of oil thru these valves is controlled and in exact relation to the closure thereof, cranking action is imparted to the entire cylindrical body section 4 thus establishing a variable hydraulic drive.

In order that this action can be controlled at the will of the operator and further allowed to run a pre-determined course, means for manual and automatic control of the valving action has been provided. The automatic portion of which comprises a simple centrifugal actuated governor-like mechanism which will provide a certain pre-determined movement in relation to a given speed of revolution, this mechanism is connected indirectly to the levers operating the valves 9 of the hydraulic transmission. The centrifugal actuated control comprises a pair of weighted levers 28 pivoted at points 29 to brackets 30 formed on the cylindrical body 4. Pivot pins 31 positioned in arms 32 of the weighted levers 28 engaging slots 33 in a bracket 34 slidably positioned on the shaft 3. A coil spring 35 being positioned on the shaft 3 between the slidable bracket 34 and a projecting portion of the cylindrical body portion 4. In order that the slidable bracket 34 be confined to certain definite limits, a ring 36 is positioned on the shaft 3 and serves to stop the outward motion of the slidable bracket 34. In order that movement of the slidable bracket 34 as caused by the movement of the weighted levers 28 due to centrifugal spin will actuate the valves 9, suitable linkage is provided and comprises a horizontal link 37, a vertical link 38, a second horizontal link 39 and arms 40; the uppermost ends of which are firmly attached to the shafts 10 thru which the valves 9 are actuated. Thus, horizontal movement, toward the right, of the bracket 34, as shown in Figure 1, which will occur upon rotation of the device and will result in the further closure of the valves 9 and the more rapid rotation of the device and hence the shaft 3 to which it is keyed. It being understood that the valves 9 have been moved by means of manual control to a pre-determined position closing them partially and thus enabling the device itself to rotate in some degree. The manual controls which make this possible comprise simply a vertical control lever 60 pivoted at a point 41 to the housing 1 of the transmission and actuating thru a flexible connection 42 a secondary slidable control bracket 43 which has an annular groove 44 formed therein in which a ring 45 is positioned; a horizontal link 46 being connected to this ring at a point 47 and also connected to one end of the vertical link 38 heretofore mentioned. Thus, in order to obtain a forward movement of the automobile the vertical control lever 60 is moved to a pre-determined position which will thru the links 46, 38, 39 and the arms 40 partially close the valves 9 and result in the rotation of the device, and as the motor speed increases the speed of rotation of the shaft 2, the weighted levers 28 move outwardly thus bringing into play the automatic control means heretofore described and serves to further close the valves 9.

In order that a reverse rotation of the shaft 3 be obtained in order to move the car backwardly, a reversing mechanism has been incorporated in this hydraulic transmission and is actuated by the vertical control lever 60. Movement of this vertical control lever 60 to a pre-determined position for reverse will open the valves 9 and also result in the movement of a bar 48 positioned at the top of the transmission housing 1 and so formed that horizontal movement thereof will permit a wheel 49 on one end of an L-shaped lever 50 which is pivoted to the housing 1 to follow an offset 51 in the bar 48 and hence permit a vertical movement of this arm of the L-shaped lever 50 and permit a horizontal movement of the other arm of the L-shaped lever 50; the lower end 52 thereof engaging an annular groove 53 in a slidable locking bracket 54. The horizontal movement of this arm being established by reason of a coil spring 55 positioned about the shaft 2 and between the slidable locking bracket 54 and the housing 1. This slidable bracket 54 has an annular flange 56 formed thereon and is held in non-revolving position on the shaft 2 by means of a pair of pins 57 which are in turn bolted or otherwise affixed to the housing 1. The flange 56 is adapted to suitably engage with a clutch like action a matching flange 58 formed on the adjacent gear 25 in such manner that rotation of the gear 25 is effectively stopped and the gear 25 held motionless in relation to the housing 1. When this occurs it is obvious that rotation of the shaft 2 in the same direction as heretofore will result in a reversal of the rotating movement of the transmission structure as the movement will be then transmitted thru the gears 24, 19 and the gear 20 which will effectively travel in a reverse motion about the gear 25 thus reversing the entire motion of the device by setting up a definite reverse geared action therethru.

What I claim is:

1. A hydraulic transmission comprising a cylinder mounted at its sides on opposing ends of a drive shaft and a driven shaft and keyed to the said driven shaft; a crankshaft positioned across one end of the said cylinder; meshed gears positioned on the said crankshaft and drive shaft; a piston having an upper and a lower head positioned in said cylinder; a rod connecting the said piston to the said crank shaft; oil positioned in the said cylinder between the said heads of the said piston; a partition in said cylinder between the two heads of the piston; valves in openings in the said partition; automatic means for opening and closing the valves actuated by the spin of the said cylinder upon the said shafts.

2. A transmission comprising a housing; a cylindrical body member positioned within the said housing on and between the opposing ends of a drive shaft and a driven shaft, and keyed to the said driven shaft; a partition near one end of the said cylinder; openings in the said partition; valves in the said openings; a double headed piston positioned in the said cylinder, one head being on one side of the said partition and one on the other side, oil placed between the said heads and maintained there by a reservoir communicating therewith; a connecting rod on said piston attached to a crankshaft positioned in the opposite end of the said cylindrical body member from which the partition is positioned, and a pair of meshed gears adapted to drive the said crankshaft from the said driveshaft, manual and automatic control means for opening and closing the said valves, the said manual means comprising a plurality of links connecting with a control lever pivoted to and extending from the said housing and the automatic means comprising a governor actuated by centrifugal spin of the said cylindrical body member and linked to the said valves so as to open and close them in direct relation to the speed of rotation of the cylindrical body.

3. A hydraulic transmission comprising a body member positioned on and between opposing ends of a drive shaft and a driven shaft and keyed to the said driven shaft; a cylinder formed in the said body member; a partition formed in said cylinder; valves in openings in said partition; a double headed piston positioned in said cylinder; the heads thereof being on opposite sides of the said partition; a crank shaft positioned in the said body member; a connecting rod connecting the said crank shaft to the said piston; meshed gears positioned on the said drive shaft and crank shaft so that revolving motion of the drive shaft will rotate the crank shaft and move the double headed piston in the said cylinder; oil positioned in the said cylinder between the heads of the double headed piston; means for manual control of the said valves in the said partition so that closure of the said valves will result in stopping the piston travel and cause the entire body member to rotate about the drive and driven shafts and thus transmit the motion of the drive shaft to the driven shaft together with a reversing mechanism comprising a secondary pair of meshed gears positioned on the said drive shaft and said crank shaft, and clutch means for stopping rotation of the said secondary gear on the said drive shaft by moving into engagement therewith a clutch disc movably mounted on a housing enclosing the said transmission.

4. A hydraulic transmission comprising a cylinder mounted at its sides on opposing ends of a drive shaft and a driven shaft and keyed to the said driven shaft; a crank shaft positioned across one end of the said cylinder; meshed gears positioned on the said crank shaft and drive shaft; a piston having an upper and a lower head positioned in said cylinder; a rod connecting the said piston to the said crank shaft; oil positioned in the said cylinder between the said heads of the said piston; a partition in said cylinder between the two heads of the piston; valves in openings in the said partition; automatic means for opening and closing the valves actuated by the spin of the said cylinder upon the said shafts together with a reversing mechanism comprising a secondary pair of meshed gears positioned on the said drive shaft and said crank shaft, and clutch means for stopping rotation of the said secondary gear on the said drive shaft by moving into engagement therewith a clutch disc movably mounted on a housing enclosing the transmission.

5. A hydraulic transmission comprising a housing; a cylindrical body member positioned within the said housing on and between the opposing ends of a drive shaft and a driven shaft and keyed to the said driven shaft; a partition near one end of the said cylinder; openings in the said partition; values in the said openings; a double headed piston positioned in the said cylinder, one head being on one side of the said partition and one on the other side; oil placed between the said heads and maintained there by a reservoir communicating therewith; a connecting rod on said piston attached to a crank shaft positioned in the opposite end of the said cylindrical body member from which the partition is positioned, and a pair of meshed gears adapted to drive the said crank shaft from the said drive shaft; manual and automatic control means for opening and closing the said valves; the said manual means comprising a plurality of links connecting with a control lever pivoted to and extending from the said housing and the automatic means comprising a governor actuated by centifugal spin of the said cylindrical body member and linked to the said valves so as to open and close them in direct relation to the speed of rotation of the cylindrical body; together with reversing means comprising a clutch mounted on the said housing and adapted to engage and hold a secondary gear positioned on the said drive shaft, said secondary gear meshed with a secondary gear on the said crank shaft so that motion of the drive shaft will revolve the crank shaft and cause the said secondary gear thereon to revolve about the secondary gear on the said drive shaft and thus reverse the motion of the cylindrical body member.

HARRY J. SHERRILL.